US011140826B2

(12) United States Patent
Racchella

(10) Patent No.: US 11,140,826 B2
(45) Date of Patent: Oct. 12, 2021

(54) FEEDERHOUSE ASSEMBLY HAVING A ROTATIONAL SHAFT WITH FLUID PASSAGES

(71) Applicant: AGCO International GmbH, Neuhausen (CH)

(72) Inventor: Fabio Racchella, Breganze (IT)

(73) Assignee: AGCO International GmbH, Neuhauseen (CH)

( * ) Notice: Subject to any disclaimer, the term of this patent is extended or adjusted under 35 U.S.C. 154(b) by 0 days.

(21) Appl. No.: 16/943,942

(22) Filed: Jul. 30, 2020

(65) Prior Publication Data

US 2021/0068343 A1    Mar. 11, 2021

(30) Foreign Application Priority Data

Sep. 11, 2019  (GB) ..................................... 1913117

(51) Int. Cl.
*A01D 67/00*    (2006.01)
*A01D 41/14*    (2006.01)
*A01D 41/02*    (2006.01)
*A01D 41/12*    (2006.01)
*A01D 69/00*    (2006.01)

(52) U.S. Cl.
CPC ........... *A01D 41/145* (2013.01); *A01D 41/02* (2013.01); *A01D 41/1208* (2013.01); *A01D 69/005* (2013.01)

(58) Field of Classification Search
USPC ......................................................... 56/208
See application file for complete search history.

(56) References Cited

U.S. PATENT DOCUMENTS

| 4,266,392 A |   | 5/1981 | Knepper et al. |
| 4,527,381 A |   | 7/1985 | Mann |
| 5,359,836 A | * | 11/1994 | Zeuner ................. A01D 41/141 |
|             |   |         | 56/10.2 E |
| 6,619,021 B1 |   | 9/2003 | Chaney et al. |
| 10,257,979 B2 |   | 4/2019 | Walter |
| 2004/0163374 A1 |   | 8/2004 | Rickert |

(Continued)

FOREIGN PATENT DOCUMENTS

| DE | 10 2015 207437 A1 | 10/2015 |
| EP | 3 072 382 A1 | 9/2016 |
| EP | 3 117 697 A1 | 1/2017 |

OTHER PUBLICATIONS

European Patent Office, Search Report prepared for related European Application No. EP 20 17 1112, dated Oct. 5, 2020.

(Continued)

*Primary Examiner* — Thomas B Will
*Assistant Examiner* — Mai T Nguyen

(57) ABSTRACT

A feederhouse assembly for an agricultural harvester includes a feederhouse comprising an inlet end, a rotational shaft coupled to the feederhouse and defining a plurality of fluid passages therethrough, and a frame adjacent the inlet end and arranged to pivot about the rotational shaft relative to the feederhouse. The frame defines a crop opening therethrough and is configured to carry a harvesting header. An agricultural harvester includes a chassis, the feederhouse assembly mounted to the chassis, and a processing system carried by the chassis and structured to receive crop material from the feederhouse.

11 Claims, 3 Drawing Sheets

(56) References Cited

U.S. PATENT DOCUMENTS

| | | |
|---|---|---|
| 2013/0192187 A1 | 8/2013 | Boyd, III et al. |
| 2014/0166433 A1 | 6/2014 | Juelke et al. |
| 2016/0278276 A1 | 9/2016 | Coninck et al. |
| 2017/0013778 A1 | 1/2017 | Borry et al. |

OTHER PUBLICATIONS

UK Intellectual Property Office, Search Report prepared for priority Application No. GB1913117.6, dated Mar. 2, 2020.

\* cited by examiner

FEEDERHOUSE ASSEMBLY HAVING A ROTATIONAL SHAFT WITH FLUID PASSAGES

CROSS-REFERENCE TO RELATED APPLICATION

This application claims the benefit of the filing date of U.K. Patent Application GB1913117.6, "Feederhouse Assembly Having a Rotational Shaft with Fluid Passages," filed Sep. 11, 2019, the entire disclosure of which is incorporated herein by reference.

FIELD

This disclosure relates to self-propelled crop-harvesting machines capable of supporting a harvesting header on the front end thereof, and particularly to a system for providing fluid to a harvesting header of the machine.

BACKGROUND

Self-propelled agricultural harvesters are well known and include, by way of example, combine harvesters, windrowers, and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower the crop material is typically passed through conditioning rollers.

The height of the header is typically adjusted by raising and lowering the feeder house around a lateral feederhouse pivot axis. To permit pitch adjustment of the header with respect to the feeder house, a header interface frame is often pivotally mounted to the feeder house over the front opening thereof to permit pitch adjustment around a transverse pitch-adjustment axis.

BRIEF SUMMARY

In some embodiments, a feederhouse assembly for an agricultural harvester includes a feederhouse comprising an inlet end, a rotational shaft coupled to the feederhouse and defining a plurality of fluid passages therethrough, and a frame adjacent the inlet end and arranged to pivot about the rotational shaft relative to the feederhouse. The frame defines a crop opening therethrough and is configured to carry a harvesting header.

An agricultural harvester includes a chassis, the feederhouse assembly mounted to the chassis, and a processing system carried by the chassis and structured to receive crop material from the feederhouse.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figures 1, 1A:
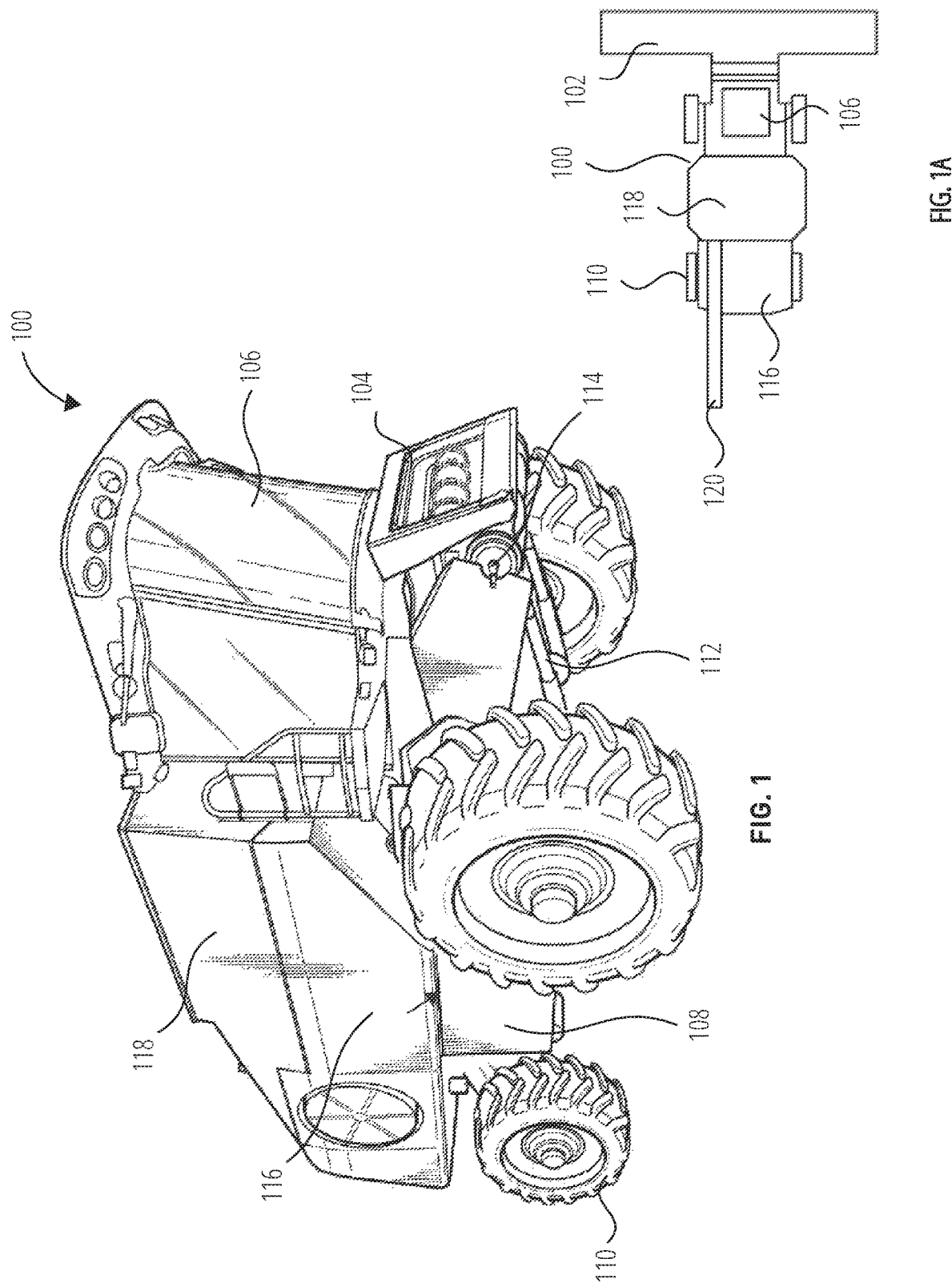
FIG. 1 is a simplified front perspective view of an example agricultural harvester.
FIG. 1A is a simplified top view of the agricultural harvester with a harvesting header attached.

The illustrations presented herein are not actual views of any agricultural harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an example agricultural harvester embodied as a combine harvester 100. In the context of the present disclosure, the example combine harvester 100 is merely illustrative, and other machines and/or implements with like functionality may include certain embodiments disclosed herein, such as windrowers, forage harvesters, etc. The example combine harvester 100 is shown in FIG. 1 without a header attached, and FIG. 1A is a top view of the combine harvester 100 with a detachably coupled harvesting header 102 attached. The combine harvester 100 includes a feederhouse assembly 104 carried by a chassis 108 supported by wheels 110. An operator cab 106 is mounted to the chassis 108. In some embodiments, other or additional forms of travel may be used, such as tracks. Hydraulic cylinders 112 are shown affixed to the underside of the feederhouse assembly 104 on one end and to the chassis 108 on the other end. The feederhouse assembly 104 may move (e.g., up and down, tilt, etc.) based on actuation of the hydraulic cylinders 112, which causes the harvesting header 102 to also be raised, lowered, and/or tilted. A power take-off (PTO) shaft 114 may be configured to provide mechanical power to the harvesting header 102 during operation of the combine harvester 100. The PTO shaft 114 may be configured to operate at various speeds, as described in, for example, U.S. Pat. No. 9,434,252, "Power Takeoff Drive System for a Vehicle," issued Sep. 6, 2016.

In general, the harvesting header 102 cuts crop and transfers the cut crop materials to the front (inlet) end of the feederhouse assembly 104. Such crop materials are moved upwardly and rearwardly within and beyond the feederhouse assembly 104 (e.g., by a conveyer) until reaching a processing system 116 comprising a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 100 and another portion (e.g., grain and possibly light chaff) through a cleaning process. In the processing system 116, the crop materials undergo threshing and separating operations. In other words, the crop materials are threshed and separated by the thresher rotor operating in cooperation with processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials are generally retained by the concave assemblies and the grate assemblies and are discharged out from the processing system 116 and ultimately out of the rear of the combine harvester 100. The cleaned grain that drops to the bottom of the cleaning system is delivered by a conveying mechanism that transports the grain to an elevator, which conveys the grain to a grain bin 118 located at the top of the combine harvester 100. Any remaining chaff and partially or unthreshed grain is recirculated through the processing system 116 via a tailings return conveying mechanism. As the grain bin 118 fills, an unloading auger 120 may remove grain therefrom to another vehicle traveling alongside the combine harvester 100. Because combine processing is known to those having ordinary skill in the art, further discussion thereof is omitted here for brevity. In embodiments in which the agricultural harvester is a windrower or forage harvester, the processing system 116 may include conditioning rollers, rather than separation devices. Furthermore, the grain bin 118 and unloading auger 120 may be omitted in such embodiments.

Figure 2:
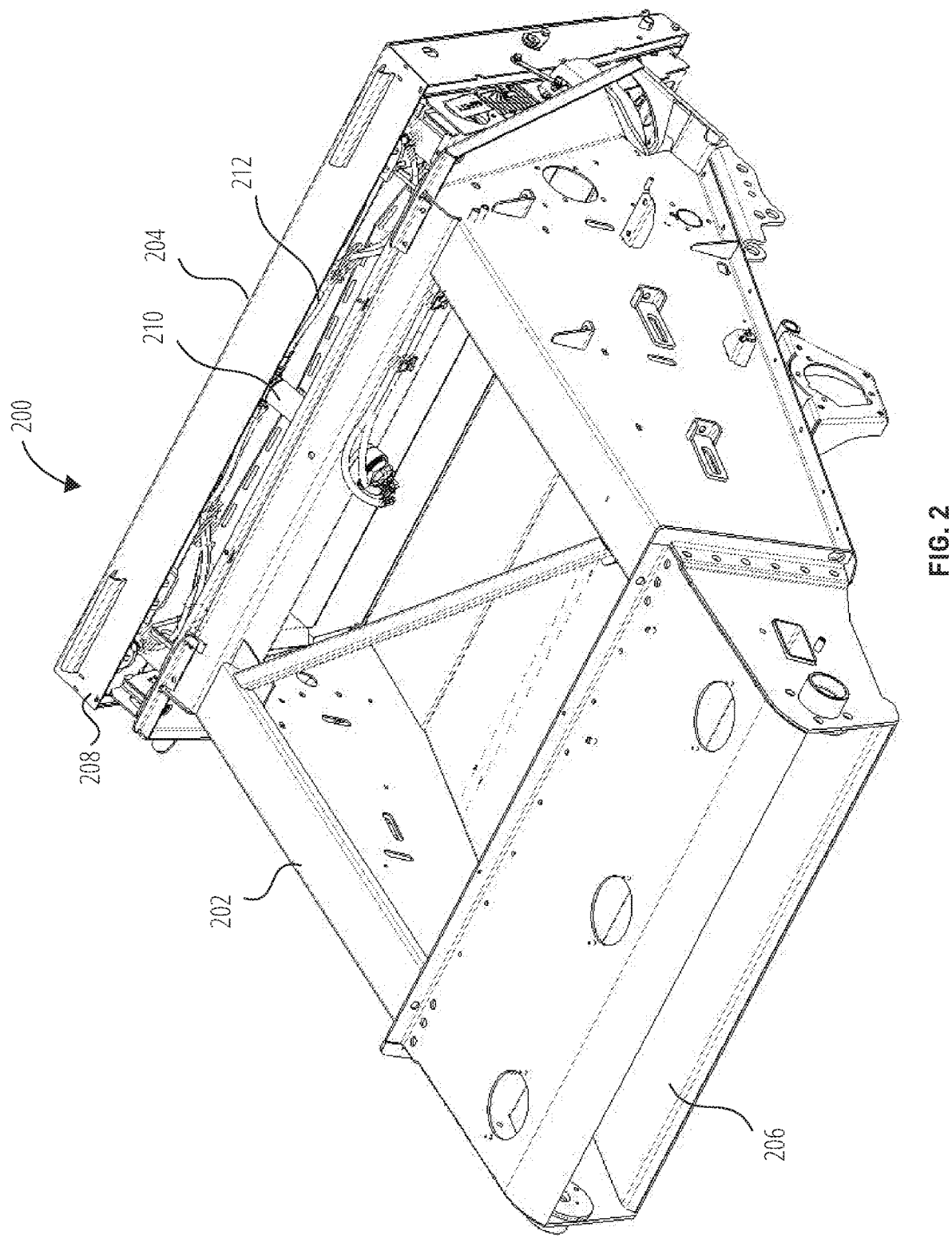
FIG. 2 illustrates a feederhouse assembly having a frame to which the harvesting header may be attached.

FIG. 2 is a simplified perspective view of the feederhouse assembly 200 of the combine harvester 100 shown in FIG. 1. As shown, a feederhouse 202 has an inlet end 204 and an outlet end 206. Crop material entering the feederhouse assembly 200 from the harvesting header travels from the inlet end 204 toward the outlet end 206 on the way to the processing system 116 (FIG. 1). The harvesting header is coupled to the feederhouse 202 by a frame 208, which is adjustable to control the orientation of the harvesting header 102 with respect to the combine harvester 100.

Control of the harvesting header 102 is important to enable a farmer to properly harvest crops. Adjustment of the frame 208 also facilitates connecting and disconnecting the harvesting header 102 because the frame 208 can be positioned to match the orientation of the harvesting header 102.

The frame 208 is adjusted by pivoting about a rotational shaft 210. Hydraulic cylinders, electric actuators, or other means may be configured to apply forces on the frame 208 to rotate the frame 208 about the rotational shaft 210, such as using hydraulic cylinders described in more detail in U.S. Pat. No. 10,257,979, "Harvester Header Pitch Adjustment Apparatus," issued Apr. 16, 2019.

Figure 3:
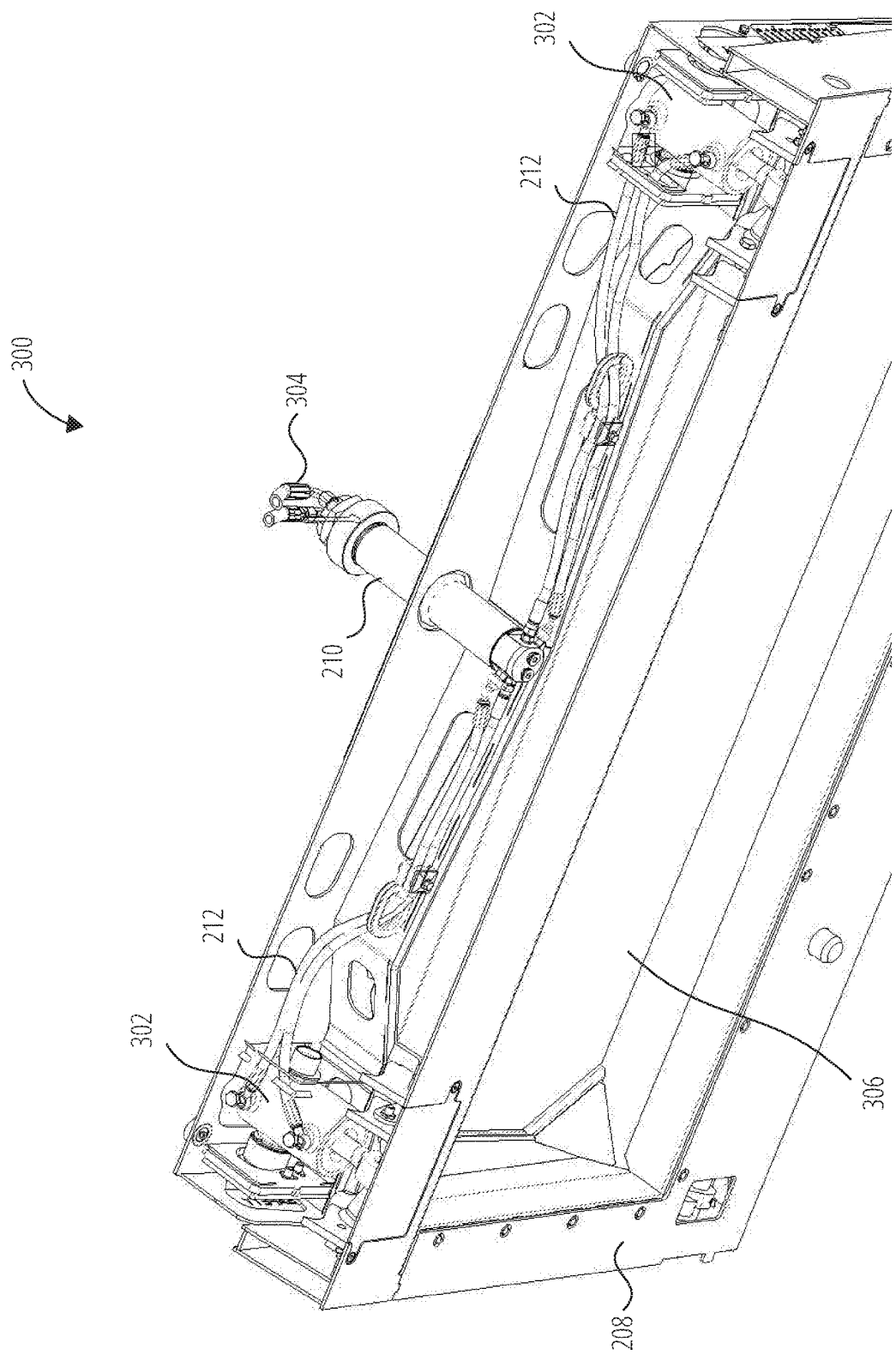
FIG. 3 is a detailed view of a portion of the frame of the feederhouse assembly shown in FIG. 2.

FIG. 3 is a front perspective view showing more detail of the frame 208 and the rotational shaft 210. The frame 208 is depicted in FIG. 3 with its top cover removed for clarity. The rotational shaft 210 is connected to hoses 212 disposed within the frame 208 configured to contain pressurized fluid, and which are connected to hydraulic cylinders 302 within the frame 208. The hydraulic cylinders 302 may be used to adjust the pitch of the front face of the frame 208 with respect to the feederhouse 202 to control the orientation of the harvesting header attached to the frame 208. The hoses 212 are connected through the rotational shaft 210 to hoses 304 of the feederhouse 202, which are connected to a source of pressurized fluid carried by the combine harvester 100.

The rotational shaft 210 may be a unitary or monolithic body with fittings (e.g., screw-on fittings) to which the hoses 212, 304 are connected. The unitary body has at least one inner surface defining the fluid passages (e.g., tubular channels). In such embodiments, the rotational shaft 210 may be capable of supporting forces (e.g., weight) nearly equivalent to forces supportable by a solid rotational shaft having similar dimensions and materials. The fluid passages through the rotational shaft 210 may have a relatively small effect on the mechanical properties of the rotational shaft 210. In other embodiments, the rotational shaft 210 may be hollow, having hoses or tubes passing through a hollow core.

In such embodiments, the rotational shaft 210 may have a relatively larger diameter to support the weight of the harvesting header, or another support may be added elsewhere to carry the load (e.g., hydraulic cylinders connecting the frame 208 to the feederhouse 202).

FIG. 3 depicts two hydraulic cylinders 302, one on each side of the top of the frame 208, but any number of hydraulic cylinders 302 may be used to control the location of the front face of the frame 208. The hydraulic cylinders 302 may be single-action hydraulic cylinders, such that each hydraulic cylinder 302 applies a hydraulic force in one direction only. In other embodiments, the hydraulic cylinders 302 may be double-action hydraulic cylinders configured to apply hydraulic forces in two opposing directions.

In use, the hoses 304 attached to one end of the rotational shaft 210 may be fixed with respect to the feederhouse 202, and the hoses 212 may be fixed with respect to the frame 208. As the frame 208 rotates about the rotational shaft 210, the hoses 212 move with the frame 208. The fluid passages within the rotational shaft 210 ensure that pressurized fluid can pass from the hoses 304 to the hoses 212 and back over a wide operating range of angles of the frame 208. Because the hoses 212 are not connected directly to the hoses 304, the danger of damage to the hoses 212, 304 during field operations is limited.

As shown in FIG. 3, the frame 208 defines a crop opening 306 through which crop material can pass from the harvesting header to the processing system 116 of the combine harvester 100.

The fluid passages within the rotational shaft 210 may limit or eliminate risks of tangling fluid hoses, connecting fluid hoses incorrectly, etc. Furthermore, the hoses may be covered within the frame and the feederhouse, such that the hoses are protected from damage from external sources. The feederhouse assembly described herein may be relatively more compact than convention assemblies.

Additional non-limiting example embodiments of the disclosure are described below.

Embodiment 1: A feederhouse assembly for an agricultural harvester, the feederhouse assembly comprising a feederhouse comprising an inlet end, a rotational shaft coupled to the feederhouse and defining a plurality of fluid passages therethrough, and a frame adjacent the inlet end and arranged to pivot about the rotational shaft relative to the feederhouse. The frame defines a crop opening therethrough. The frame is configured to carry a harvesting header.

Embodiment 2: The feederhouse assembly of Embodiment 1, wherein the rotational shaft comprises a unitary body defining a cylindrical outer surface and an inner surface of each of the fluid passages.

Embodiment 3: The feederhouse assembly of Embodiment 1 or Embodiment 2, further comprising a plurality of hoses carried by the frame and connected to the fluid passages.

Embodiment 4: The feederhouse assembly of Embodiment 3, wherein the plurality of hoses are disposed within the frame.

Embodiment 5: The feederhouse assembly of any one of Embodiment 1 through Embodiment 4, wherein the fluid passages are configured to be connected to a pressurized fluid source carried by the agricultural harvester.

Embodiment 6: The feederhouse assembly of any one of Embodiment 1 through Embodiment 5, further comprising at least one hydraulic cylinder configured to move the frame with respect to the feederhouse, wherein the plurality of fluid passages are in fluid connection with the at least one hydraulic cylinder.

Embodiment 7: The feederhouse assembly of Embodiment 6, wherein the at least one hydraulic cylinder is configured to adjust a pitch of a face of the frame with respect to the feederhouse.

Embodiment 8: The feederhouse assembly of Embodiment 6 or Embodiment 7, wherein the at least one hydraulic cylinder comprises at least two hydraulic cylinders.

Embodiment 9: The feederhouse assembly of any one of Embodiment 6 through Embodiment 8, wherein the at least one hydraulic cylinder comprises at least one double-acting hydraulic cylinder.

Embodiment 10: An agricultural harvester comprising a chassis, the feederhouse assembly of any one of Embodiment 1 through Embodiment 9 mounted to the chassis, and a processing system carried by the chassis and structured to receive crop material from the feederhouse.

Embodiment 11: The agricultural harvester of Embodiment 10, further comprising a harvesting header coupled to the frame.

Embodiment 12: The agricultural harvester of Embodiment 10 or Embodiment 11, further comprising a grain bin carried by the chassis and structured to receive grain from the processing system.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A feederhouse assembly for an agricultural harvester, the feederhouse assembly comprising:
   a feederhouse comprising an inlet end;
   a rotational shaft coupled to the feederhouse and defining a plurality of fluid passages therethrough, wherein the fluid passages are configured to be connected to a pressurized fluid source carried by the agricultural harvester; and
   a frame adjacent the inlet end and arranged to pivot about the rotational shaft relative to the feederhouse, the frame defining a crop opening therethrough and configured to carry a harvesting header.

2. The feederhouse assembly of claim 1, wherein the rotational shaft comprises a unitary body defining a cylindrical outer surface and an inner surface of each of the fluid passages.

3. A feederhouse assembly for an agricultural harvester, the feederhouse assembly comprising:
   a feederhouse comprising an inlet end;
   a rotational shaft coupled to the feederhouse and defining a plurality of fluid passages therethrough;
   a frame adjacent the inlet end and arranged to pivot about the rotational shaft relative to the feederhouse, the frame defining a crop opening therethrough and configured to carry a harvesting header; and a plurality of hoses carried by the frame and connected to the fluid passages.

4. The feederhouse assembly of claim 3, wherein the plurality of hoses are disposed within the frame.

5. A feederhouse assembly for an agricultural harvester, the feederhouse assembly comprising:
- a feederhouse comprising an inlet end;
- a rotational shaft coupled to the feederhouse and defining a plurality of fluid passages therethrough;
- a frame adjacent the inlet end and arranged to pivot about the rotational shaft relative to the feederhouse, the frame defining a crop opening therethrough and configured to carry a harvesting header; and
- at least one hydraulic cylinder configured to move the frame with respect to the feederhouse, wherein the plurality of fluid passages are in fluid connection with the at least one hydraulic cylinder.

6. The feederhouse assembly of claim 5, wherein the at least one hydraulic cylinder is configured to adjust a pitch of a face of the frame with respect to the feederhouse.

7. The feederhouse assembly of claim 5, wherein the at least one hydraulic cylinder comprises at least two hydraulic cylinders.

8. The feederhouse assembly of claim 5, wherein the at least one hydraulic cylinder comprises at least one double-acting hydraulic cylinder.

9. An agricultural harvester, comprising:
- a chassis;
- a feederhouse comprising an inlet end and carried by the chassis;
- a rotational shaft coupled to the feederhouse and defining a plurality of fluid passages therethrough, wherein the fluid passages are configured to be connected to a pressurized fluid source carried by the agricultural harvester;
- a frame adjacent the inlet end of the feederhouse and arranged to pivot about the rotational shaft relative to the feederhouse, the frame defining a crop opening therethrough and configured to carry a harvesting header; and
- a processing system carried by the chassis and structured to receive crop material from the feederhouse.

10. The agricultural harvester of claim 9, further comprising a harvesting header coupled to the frame.

11. The agricultural harvester of claim 9, further comprising a grain bin carried by the chassis and structured to receive grain from the processing system.

* * * * *